United States Patent Office 3,514,296
Patented May 26, 1970

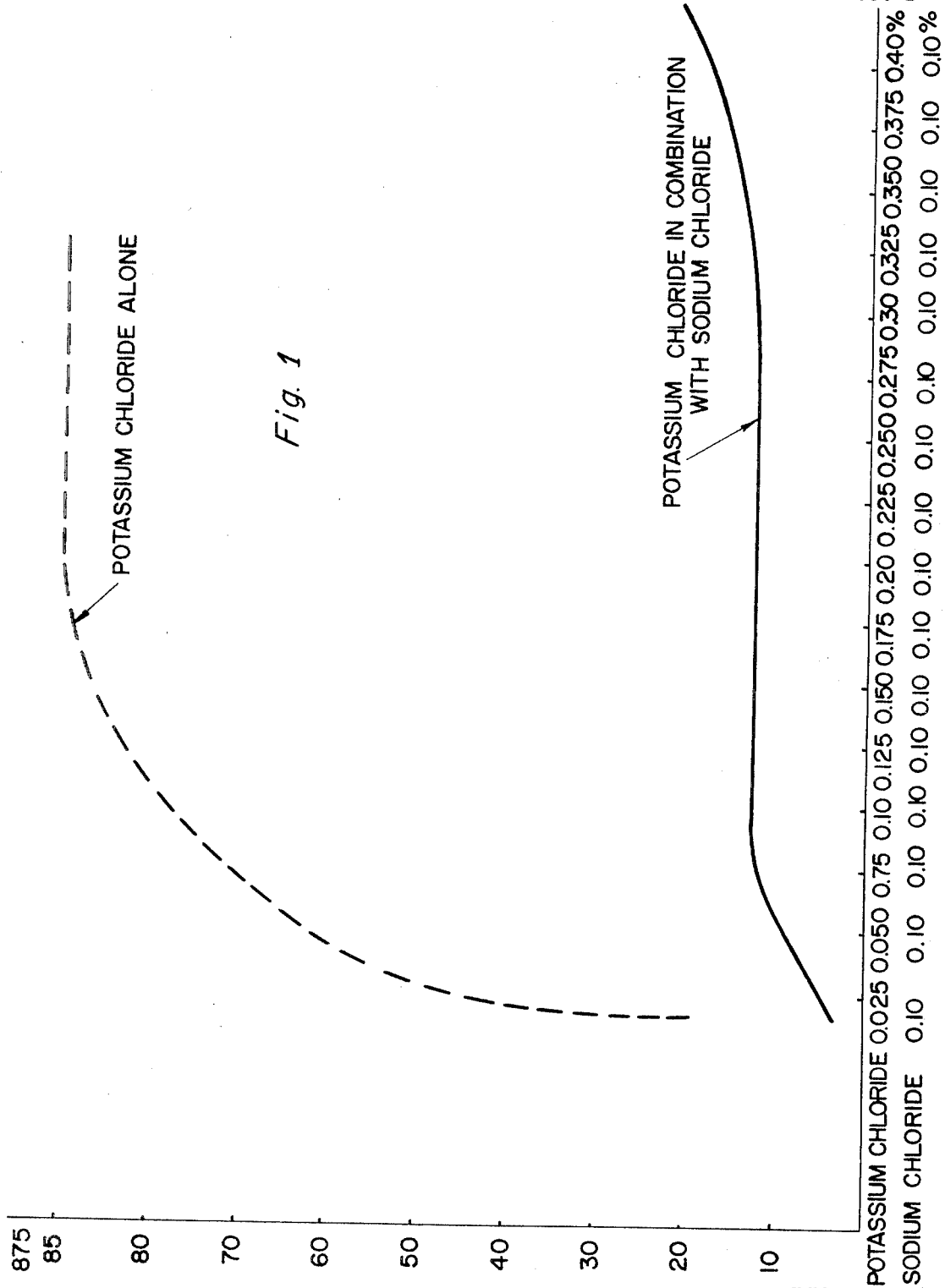

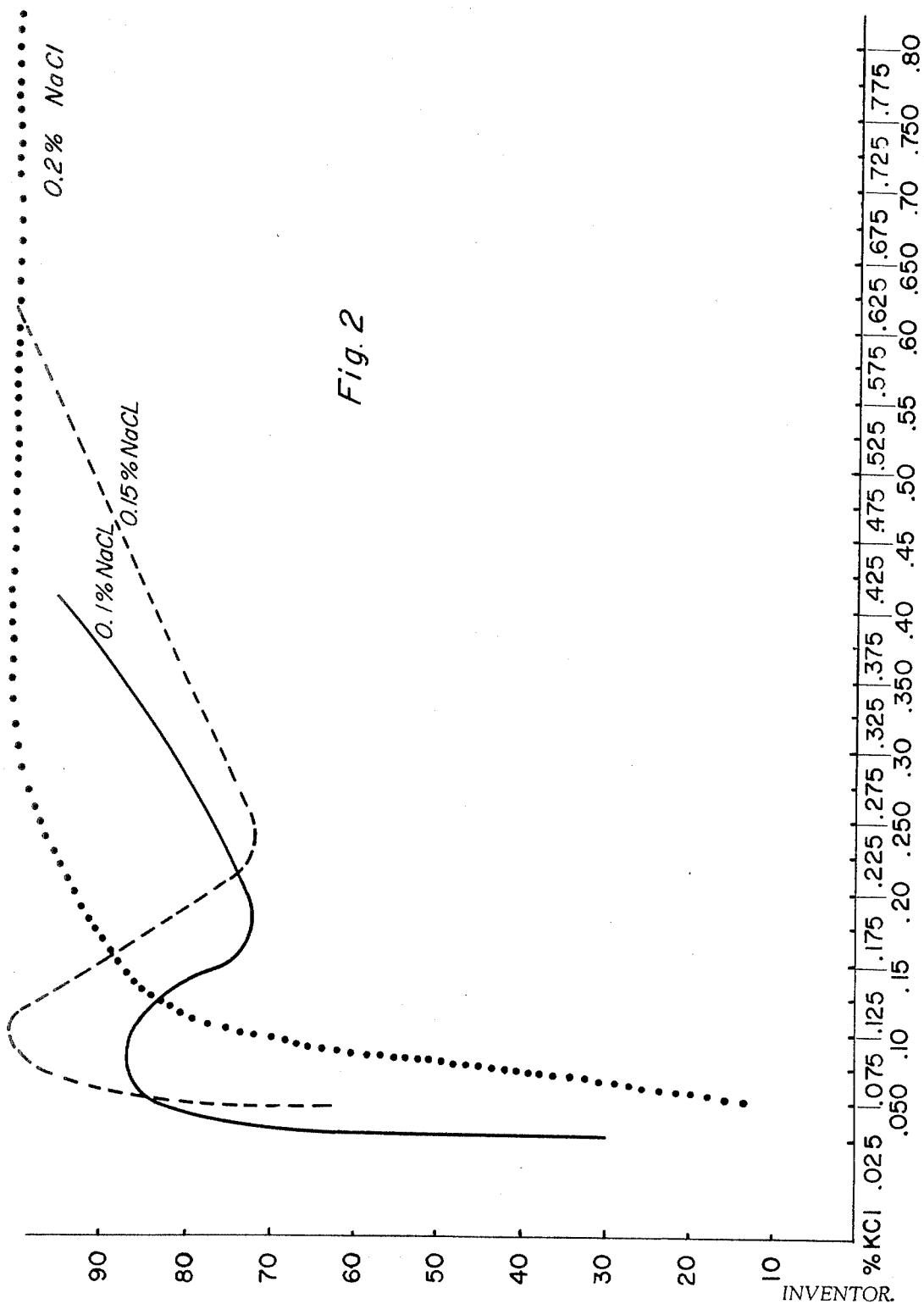

3,514,296
SALT SUBSTITUTE
Robert L. Frank, Lake Geneva, Wis., and Olaf Mickelsen, Okemos, Mich., assignors to Morton International, Inc., Chicago, Ill., a corporation of Delaware
Filed Jan. 16, 1967, Ser. No. 609,396
Int. Cl. A23l 1/22
U.S. Cl. 99—143 ............ 7 Claims

ABSTRACT OF THE DISCLOSURE

Table salt can be substituted with a palatable composition consisting essentially of, on a relative proportion basis, about 20 to 80 percent by weight of potassium chloride and about 80 to 20 percent by weight of sodium chloride. The composition is characterized in having a bitter taste to not more than about 20 percent of the population and in having a saltiness taste greater than an equal quantity of the sodium chloride component alone.

This invention relates to edible compositions comprising potassium chloride and sodium chloride for use as palatable condiments for comestibles, as substitutes for common table salt, as a convenient means of introducing potassium into the diet where medically indicated, and to the process for producing said compositions.

There are a number of human disease conditions for which medical science prescribes a low sodium diet. These involve congestive heart failure, hypertension, renal disease, cirrhosis of the liver, toxemias of pregnancy and Meniere's disease (Sodium-Restricted Diets, Food and Nutrition Board, National Research Council, Publication 325 (1954)). There is also a body of literature which suggests that diets high in sodium actually cause the condition known as hypertension. There are, for this reason, asserted advantages for low sodium diets even for ostensibly normal healthy individuals (Dahl, L. K., American Journal Clinical Nutrition, 6 (1), 1–7 (1958)).

Another factor in the etiology of these pathological conditions, known since the time of von Bunge (von Bunge, G., Physiologische Chemie, 3rd ed., Leipsig, 1894), and described more fully in the recent literature (Meneely, G. R., and Ball, C. O. T., American Journal of Medicine, 25, 713–725 (1958)) is that the dietary intake of potassium ion is also important from a nutritional and physiological point of view. Indeed, the ratio of sodium to potassium in the diet and in the body fluids appears to be at least as important as the intake of sodium alone. For example, a high intake of sodium chloride, which may be harmful in a disease such as hypertension, appears to be not harmful at all if a potassium salt is also included in the diet. Priddle has shown that hypertensive patients improved in health rapidly when potassium tartrate was administered orally (Priddle, W. W., Canadian Medical Association Journal, 25, 5–8 (1931)).

Others in the medical field have found that there is a physiological relation between sodium and potassium, the one ion, in many bodily reactions, counteracts the other.

Potassium deficiencies in the diet are commonplace and are caused in part by the refining of foods, in part by over-cooking, and in part by the exclusion from the diet of leafy green vegetables, a particularly rich source of potassium. Some clinical conditions which have their genesis in potassium deficiencies are overall muscle weakness, hypotension, weak extremities, poor intestinal tone with intestinal distension, cardiac weakness, weakness of respiratory muscles even to the point of ultimate failure. To combat these conditions, a variety of enteric-coated tablets of potassium chloride and various potassium supplements have been made available by the pharmaceutical industry.

Restriction of sodium intake and increase of potassium intake have therefore been prescribed as therapeutic measures for the treatment of the above described clinical conditions. Where restriction of sodium in the diet is the primary objective, a dietary regimen in which sodium chloride is entirely excluded is usually prescribed. This approach is generally not very satisfactory over a prolonged period of time because of the lack of acceptability by the patient of a bland, unpalatable diet. This has led to the development of a variety of salt substitutes which contain no sodium chloride and still have varying degrees of salinity to the teste buds. Among the various salt substitutes which have been used for this purpose, most contain potassium chloride and ammonium chloride. However, potassium chloride and ammonium chloride per se have disagreeable, bitter aftertastes and an adverse gustatory effect which detract markedly from their voluntary acceptance and use. In addition, ammonium chloride upon ingestion, because of its excessive acidity, tends to produce acidosis by disturbing the acid-base balance in the blood.

Potassium chloride, in the form of enteric-coated pills, has been prescribed for many patients to prevent the disturbing symptoms associated with a deficiency of potassium ion. This concentrated form of potassium chloride has recently been shown to produce intestinal ulceration. All studies indicate that this condition does not occur when potassium chloride is consumed in smaller doses with meals by sprinkling on food.

To mask or overcome the bitter taste of potassium chloride, an assortment of diluents, additives or adjuncts have been proposed. Among the many additives which have been employed are potassium and calcium formate, magnesium citrate, dipotassium succinate, and a variety of citrates, tartrates, gluconates, ascorbates, cyclamates, glutamates and ion exchange resins. One drawback inherent in the use of these additives is that the true salty or zesty flavor associated with salt is lost or impaired. Another drawback is that many of these additives stratify or segregate due to the dissimilarity in crystal structure and density between the additive and the potassium or ammonium chloride.

Accordingly, it would therefore be desirable to provide a condiment composition containing potassium chloride which composition has a true salty taste and is free of a bitter taste to a majority of the population.

It is an object of the present invention to provide a novel palatable substitute for table salt which substitute contains potassium chloride and also retains the salty taste associated with sodium chloride.

It is another object of the present invention to provide a palatable substitute for salt which substitute incorporates potassium chloride without the attendant bitter taste which a significant segment of the population detects in potassium chloride.

It is a further object of the present invention to provide a palatable saline condiment for comestibles incorporating potassium chloride which resists segregation or stratification upon storage, agitation or handling.

It is a still further object of the present invention to provide a palatable saline condiment for comestibles which has the above mentioned qualities and which may be readily and easily prepared without resort to laborious and complicated manufacturing procedures.

The fulfillment of these and other objects of this invention may be more readily appreciated by reference to the following specification, examples and appended claims.

Accordingly, in one broad form, the foregoing and other objects of this invention are attained by a composition which comprises from about 20 to about 80 weight percent of potassium chloride in admixture with from about 80 to about 20 weight percent of sodium chloride.

To state the weight relationships differently, the compositions of this invention comprise from about ¼ part to about 4 parts by weight of potassium chloride per part of sodium chloride.

In the preferred embodiment of the present invention the composition comprises from about 40 to about 60 weight percent of potassium chloride and from about 60 to about 40 weight percent of sodium chloride. This corresponds to from about ⅔ to about 1½ parts of potassium chloride per part of sodium chloride.

The surprising and unexpected nature of this discovery can be appreciated by reference to the literature which abundantly reports the fact of the bitter taste of potassium chloride and ammonium chloride, and the multiplicity of additives, other than sodium chloride, which have been used to ameliorate this unpleasant taste. The fact that a combination of potassium chloride and sodium chloride, in the indicated proportions, provides a synergistic or enhanced reduction in bitterness to a significant segment of the population over that of potassium chloride alone is unexpected and entirely unpredictable. The reduction in bitter taste of the aforementioned compositions is greater than can be accounted for by the dilutive effect of sodium chloride. In addition, it was also unexpectedly discovered that the compositions of the present invention have an enhanced salty taste over sodium chloride alone.

The compositions of the present invention are prepared by thoroughly and efficiently admixing the components in the indicated proportions until a homogeneous product is attained. A homogeneous nonsegregating composition is provided since sodium chloride and potassium chloride are similar in crystal structure, both belonging to the cubic system; they have similar specific gravities, so that mixtures do not lose their homogeneity; the refractive indices of the crystals are similar, so that individual crystals of sodium and potassium chlorides look alike; and the water solubilities of sodium chloride and potassium chloride are not greatly different. Interestingly, and of practical value in this invention, because potassium has a higher atomic weight than sodium, a mixture with a given ratio of sodium chloride to potassium chloride will have a lower ratio of sodium to potassium. This is shown in the following table:

PERCENTAGES AND RATIOS OF NaCl, KCl, Na+ AND K+ IN VARIOUS MIXTURES

| Percent NaCl | Percent KCl | Percent Na | Percent K | Ratio NaCl:KCl (by weight) | Ratio Na+:K+ (by weight) |
|---|---|---|---|---|---|
| 100 | 0 | 39.20 | 0.00 | 0 | 0 |
| 90 | 10 | 35.30 | 5.25 | 9.00 | 6.73 |
| 80 | 20 | 31.40 | 10.50 | 4.00 | 3.00 |
| 70 | 30 | 27.55 | 15.75 | 2.33 | 1.75 |
| 60 | 40 | 23.60 | 21.00 | 1.50 | 1.12 |
| 50 | 50 | 19.65 | 26.20 | 1.00 | 0.75 |

Thus, combinations of potassium chloride and sodium chloride, comprising from about 20 to about 80 weight percent of potassium chloride, and from about 80 to about 20 weight percent of sodium chloride, actually represent from about 10.5 to about 42.0 weight percent of potassium ions and correspondingly from about 31.4 to about 7.8 percent of sodium ion. It is thus evident that the aforementioned combinations of potassium chloride and sodium chloride provide ratios of potassium ion to sodium ion which vary from a low of about 1:3 to a high of about 5.4:1, thereby furnishing greater relative quantities of potassium ion than is apparent from the indicated proportions of potassium chloride and sodium chloride.

To arrive at a quantitative determination of that proportion of the population which detects a decreased bitterness and enhanced saltiness phenomenon exhibited by the above indicated combinations of potassium chloride and sodium chloride, statistically sound taste panel evaluations were carried out: (1) on sodium chloride alone to establish the minimum concentration of sodium chloride which can be detected as salty by a majority of the population; (2) on potassium chloride alone to establish the minimum concentration of potassium chloride which can be detected as bitter by a majority of the population, (3) on mixtures of sodium chloride and potassium chloride containing a relative percent of potassium chloride and sodium chloride ranging from 20 to 80 weight percent of potassium chloride and from 80 to 20 weight percent of sodium chloride to establish the proportion of the population classifying such mixtures as bitter and as having enhanced saltiness when compared to sodium chloride alone.

The following test procedure and examples illustrate more fully the quantitative determination of reduced bitterness and enhanced saltiness of the compositions of the present invention.

EXAMPLE I

Procedure for determining saltiness taste threshold for sodium chloride

Aqueous solutions are pure sodium chloride were prepared containing 0.025% NaCl, 0.05% NaCl, 0.10% NaCl and 0.20% NaCl, respectively.

A five-milliliter portion of each of these solutions was given repetitively to each member of a six-member taste-test panel for his or her taste evaluation. The solutions were coded and not otherwise identified to the panelists.

Each panel member rinsed his mouth with water thoroughly after each taste test. The saltiness of each solution was noted and compared with the preceding solution and rated in increasing order of saltiness.

The results are set forth in Table I.

TABLE I.—SALTINESS TASTE THRESHOLD FOR NlC

| Concentration of sodium chloride, percent: | Percent panelists rating solution saltier than water |
|---|---|
| 0.025 | 54 |
| 0.05 | 50 |
| 0.10 | 92 |
| 0.20 | 92 |

These results demonstrate that the taste threshold for sodium chloride for the vast majority of the population, i.e., more than 90 percent, is at a sodium chloride concentration of 0.10 percent. This concentration of sodium chloride was therefore the minimum selected for combination with potassium chloride in subsequent taste evaluations.

EXAMPLE II

Procedure for determining taste threshold for potassium chloride

As hereinbefore stated, potassium chloride is acknowledged to have a bitter taste to a majority of the population. To evaluate this on a quantitative basis, solutions of pure potassium chloride were prepared containing 0.025%, 0.064%, 0.075%, 0.15%, and 0.256% potassium chloride. The taste testing procedure followed was the same as that set forth for sodium chloride. The results obtained appear in Table II.

TABLE II

| Concentration of potassium chloride, percent: | Percent panelists rating solution bitter |
|---|---|
| 0.025 | 25 |
| 0.064 | 67 |
| 0.075 | 68 |
| 0.15 | 74 |
| 0.256 | 83 |

It is thus evident that a concentration of KCl in excess of about 0.025% is required before a significant proportion of the population can detect its presence. It is further evident that a substantial majority of the population classifies as bitter the taste of potassium chloride when it is present in excess of about 0.025%.

EXAMPLE III

Determination of bitterness of combinations of potassium chloride and sodium chloride determinations In accordance with the lower taste threshold determinations for both sodium chloride and potassium chloride, respectively, solutions were prepared containing admixtures of 0.10% sodium chloride with 0.025% KCl, 0.06% KCl, 0.15% KCl, and 0.40% KCl, respectively. Each of these solutions was evaluated for palatability with respect to bitterness by the taste testing procedure hereinbefore described for pure sodium chloride. The results appear in Table III.

TABLE III

| Concentration of NaCl, percent | Concentration of KCl, percent | Relative Percent NaCl and KCl in Mixture | Percent Population Classifying Mixture as Bitter |
|---|---|---|---|
| 0.10 | 0.025 | 80% NaCl, 20% KCl | 5 |
| 0.10 | 0.064 | 60% NaCl, 40% KCl | 11 |
| 0.10 | 0.15 | 40% NaCl, 60% KCl | 12 |
| 0.10 | 0.40 | 20% NaCl, 80% KCl | 24 |

Comparing the results set forth in Table III with those obtained for the corresponding solution of potassium chloride alone in Table II, there is observed a marked decrease in bitterness of the admixture of potassium chloride and sodium chloride over potassium chloride per se. A direct comparison between the bitterness of admixtures of potassium chloride and sodium chloride and that of potassium chloride per se is provided by Table IV.

TABLE IV

| Concentration of NaCl, percent | Concentration of KCl, percent | Relative percent of NaCl and KCl in Mixture | Actual Classification as Bitter (Percent population) | Expected Classification as Bitter (Percent Population) | Synergism [1] | Percent Synergism [2] |
|---|---|---|---|---|---|---|
| 0.10 | | | 0 | | | |
| | 0.025 | | 25 | | | |
| | 0.064 | | 67 | | | |
| | 0.075 | | 68 | | | |
| | 0.15 | | 74 | | | |
| | 0.256 | | 83 | | | |
| 0.10 | 0.025 | 80% NaCl 20% KCl | 5 | 25 | 20 | 80 |
| 0.10 | 0.064 | 60% NaCl 40% KCl | 11 | 67 | 56 | 84 |
| 0.10 | 0.15 | 40% NaCl 60% KCl | 12 | 74 | 62 | 84 |
| 0.10 | 0.40 | 20% NaCl 80% KCl | 24 | [3] >83 | >59 | 71 |

[1] Calculated by subtracting the "Actual" from the "Expected,"
[2] Calculated from the following expression:
$$\frac{(\text{Expected}-\text{Actual}) \times 100}{\text{Expected}}$$
[3] This is based on a classification of bitter for 0.256% KCl by 83% of the population.

It is evident from this tabulation that the admixture affords an enhanced or synergistic decrease in bitterness over that which would be expected from the individual bitterness contributions of the separate components. Thus, for example, 0% of the population classifies 0.10% NaCl alone as bitter and 67% of the population classifies 0.064% KCl alone as bitter. Yet when a solution is prepared which contains both 0.10% NaCl and 0.064% of KCl in combination, only 11% of the population classifies this combination as bitter.

The data presented in Table IV are depicted graphically in FIG. 1. As shown in FIG. 1, the broken line graph represents a plot of the percent of the population detecting a bitter taste versus the concentration of potassium chloride; the solid line represents a plot of the percent of the population detecting a bitter taste versus the indicated concentrations of potassium chloride in admixture with 0.10% sodium chloride, respectively. As is evident from the graph, the combinations of potassium chloride and sodium chloride provide compositions which taste bitter to a significantly smaller segment of the population than potassium chloride alone in comparable proportions.

As previously stated, another unexpected attribute of the compositions of the present invention is that of enhanced saltiness. This advantage was surprising in view of the expected bitterness contribution by the potassium chloride component.

The following taste test procedure was employed to evaluate quantitatively the enhanced salty taste of the compositions of this invention:

Determination of saltiness enhancement of sodium chloride by addition of potassium chloride As before, aqueous solutions containing 0.10% sodium chloride and 0.025% KCl, 0.064% KCl, 0.15% KCl and 0.40% KCl, respectively, were prepared and evaluated for saltiness taste by the following method:

A five-milliliter portion of each of these solutions was given repetitively to each member of a taste-test panel for his or her taste evaluation. The solutions were coded and not otherwise identified to the panelists.

Each panel member rinsed his mouth with water thoroughly after each taste test. The saltiness of each solution containing the aforedescribed combinations of sodium chloride and potassium chloride was noted and compared with a solution containing 0.10% sodium chloride. The solutions were then rated in increasing order of saltiness. The results obtained are set forth in Table V.

TABLE V

| Actual Percent NaCl | Actual Percent KCl | Relative Percent NaCl and KCl in Mixture | Enhanced Saltiness* |
|---|---|---|---|
| 0.10 | 0 | 100% NaCl | |
| 0.10 | 0.025 | 80% NaCl, 20% KCl | 29 |
| 0.10 | 0.064 | 60% NaCl, 40% KCl | 86 |
| 0.10 | 0.15 | 40% NaCl, 60% KCl | 72 |
| 0.10 | 0.40 | 20% NaCl, 80% KCl | 93 |

*Percent population rating solution saltier than a 0.10% sodium chloride solution.

The above taste evaluation test was repeated using an aqueous solution containing 0.15% sodium chloride in admixture with 0.038% KCl, 0.099% KCl, 0.225% KCl, and 0.60% KCl, respectively. The results obtained are set forth in Table VI.

TABLE VI

| Actual percent NaCl | Actual percent KCl | Percent NaCl and KCl in Mixture | Saltiness, percent |
|---|---|---|---|
| 0.15 | 0 | 100 NaCl | |
| 0.15 | 0.038 | 80 NaCl, 20 KCl | 71 |
| 0.15 | 0.099 | 60 NaCl, 40 KCl | 100 |
| 0.15 | 0.225 | 40 NaCl, 60 KCl | 71 |
| 0.15 | 0.60 | 20 NaCl, 80 KCl | 100 |

The above taste evaluation test was repeated using an aqueous solution containing 0.2% sodium chloride in admixture with 0.05% KCl, 0.133% KCl, 0.30% KCl, and 0.80% KCl, respectively. The results are set forth in Table VII.

TABLE VII

| Actual percent NaCl | Actual percent KCl | Percent NaCl and KCl in Mixture | Saltiness, percent |
|---|---|---|---|
| 0.20 | | 100 NaCl | |
| 0.20 | 0.05 | 80 NaCl, 20 KCl | 14 |
| 0.20 | 0.133 | 60 NaCl, 40 KCl | 86 |
| 0.20 | 0.30 | 40 NaCl, 60 KCl | 100 |
| 0.20 | 0.80 | 20 NaCl, 80 KCl | 100 |

These results demonstrate that a preponderant majority of the population detects a saltier taste in the compositions of the present invention than in sodium chloride alone. The data of Tables V, VI, and VII are depicted graphically in FIG. 2. As shown in FIG. 2, the solid line graph represents a plot of the percent of the population detecting enhanced saltiness versus the indicated concentration of potassium chloride in combination with 0.10% sodium chloride. The dashed line graph represents a plot of the percent of the population detecting enhanced saltiness versus the indicated concentration of potassium chloride in combination with 0.15% sodium chloride. The dotted line graph represents a plot of the percent of the population detecting enhanced saltiness versus the indicated concentrations of potassium chloride in combination with 0.20% sodium chloride.

While several particular embodiments of this invention are shown above, it will be understood, of course, that the invention is not to be limited thereto, since many modifications may be made and it is contemplated, therefore, by the appended claims, to cover such modifications as fall within the true spirit and scope of this invention.

We claim:

1. A culinary seasoning salt composition of matter consisting essentially of on a relative proportion basis, from about 20 to about 80 percent by weight of potassium chloride and from about 80 to about 20 percent by weight of sodium chloride.

2. A culinary seasoning salt composition of matter according to claim 1 wherein on a relative proportion basis the concentration of potassium chloride is about 20 percent and the concentration of sodium chloride content is about 80 percent.

3. A culinary seasoning salt composition of matter according to claim 1 wherein on a relative proportion basis the potassium chloride content is about 40 percent and the sodium chloride content is about 60 percent.

4. A culinary seasoning salt composition of matter according to claim 1 wherein on a relative proportion basis the potassium chloride content is about 50 percent and the sodium chloride content is about 50 percent.

5. A culinary seasoning salt composition of matter according to claim 1 wherein on a relative proportion basis the potassium chloride content is about 60 percent and the sodium chloride content is about 40 percent.

6. A culinary seasoning salt composition of matter according to claim 1 wherein on a relative proportion basis the potassium chloride content is about 80 percent and the sodium chloride content is about 20 percent.

7. The method of inhibiting the bitter taste of potassium chloride for at least about 80 percent of the population and providing a culinary seasoning salt composition having a saltiness taste greater than an equal quantity of the sodium chloride component alone comprising admixing sodium chloride and potassium chloride to form a composition consisting essentially of on a relative proportion basis from about 20 to about 80 percent by weight of sodium chloride with from about 80 to about 20 percent by weight of potassium chloride until a homogeneous mass is produced.

References Cited
UNITED STATES PATENTS 1,978,040 10/1934 Daitz ---------------- 99—143
2,742,366 4/1956 Power ---------------- 99—143

A. LOUIS MONACELL, Primary Examiner

D. M. NAFF, Assistant Examiner

PO-1050
(5/69)

UNITED STATES PATENT OFFICE
CERTIFICATE OF CORRECTION

Patent No. 3,514,296  Dated MAY 26, 1970

Inventor(s) ROBERT L. FRANK and OLAF MICKELSEN

It is certified that error appears in the above-identified patent and that said Letters Patent are hereby corrected as shown below:

Col. 3, Line 48, last column of Table - "Na:+K+ should be --Na+:K+--

Col. 4, Line 33, "NlC" should be --NaCl--

SIGNED AND SEALED
NOV 24 1970

(SEAL)
Attest:

Edward M. Fletcher, Jr.
Attesting Officer

WILLIAM E. SCHUYLER, JR.
Commissioner of Patents